United States Patent Office 3,242,233
Patented Mar. 22, 1966

---

3,242,233
GRAFT POLYMERS OF A POLYMERIZABLE MONOMER ONTO AN S-(4-VINYLBENZYL)ISOTHIO-URONIUM CHLORIDE COPOLYMER BACKBONE AND PROCESS OF MAKING SAME
Chester T. Chmiel, Newfoundland, N.J., and Samuel J. Nelson, Jr., Grosse Pointe, Mich., assignors to United States Rubber Company, New York, N.Y., a corporation of New Jersey
No Drawing. Filed Mar. 6, 1963, Ser. No. 263,140
11 Claims. (Cl. 260—88.1)

This invention relates to new graft polymers, and to the method of making the same.

The spine of the graft polymer is a linear copolymer of a minor proportion of S-(4-vinylbenzyl)isothiouronium chloride and a major proportion of monomeric material selected from the group consisting of styrene, acrylonitrile, alkyl esters of acrylic acid having 1 to 12 carbon atoms in said alkyl radical and alkyl esters of methacrylic acid having 1 to 12 carbon atoms in said alkyl radical, after certain treatment and modification of the copolymer as described below. Examples of the alkyl esters of acrylic and methacrylic acids are methyl acrylate, methyl methacrylate, butyl acrylate, lauryl methacrylate. The said copolymer is prepared by reacting in a liquid medium S-(4-vinylbenzyl)isothiouronium chloride and the copolymerizable monomeric material in the presence of a free-radical polymerization initiator as described and claimed in a U.S. application Serial No. 263,102 of Chester T. Chmiel, Samuel J. Nelson, Jr., and Robert Miller entitled, "Copolymers," filed concurrently herewith and to which reference is hereby made. The S-(4-vinylbenzyl)isothiouronium chloride is prepared by reacting the known 4-(chloromethyl) styrene (see Clark et al. U.S. Patent No. 2,780,604) with thiourea as described and claimed in a U.S. application Serial No. 263,110 of Samuel J. Nelson, Jr., entitled, "New Chemicals," filed concurrently herewith and to which reference is hereby made. The S-(4-vinylbenzyl)isothiouronium chloride may be represented by the formula

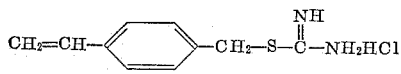

Illustrative of the preparation of S-(4-vinylbenzyl)isothiouronium chloride is the following Example A details of which are taken from the aforementioned Nelson application, entitled, "New Chemicals," filed concurrently herewith, and for which no invention is claimed in this application.

Example A

A one-liter Erlenmeyer flask is charged with 91.8 g. (0.602 mole) of 4-(chloromethyl)styrene, 48.0 g. (0.63 mole) of thiourea, 1.2 g. of tert-butylcatechol, and 180 ml. of methanol. Frequently, a small amount of polymer precipitates upon the addition of methanol, and is removed by the addition of charcoal and filtration. The flask is stoppered and placed in the oven over night at 47° C. The flask is then cooled, and the desired S-(4-vinylbenzyl)isothiouronium chloride is precipitated with ether. The yield is 126 grams, or 92% of theory.

Examples B, C and D below illustrate the preparation of copolymers of a minor proportion of S-(4-vinylbenzyl) isothiouronium chloride and a major proportion of the copolymerizable monomeric material referred to above. These copolymers and their preparation are described in the aforementioned Chmiel, Nelson, Jr., and Miller application, entitled, "Copolymers," filed concurrently herewith, and no invention is claimed therefor in this application.

Example B

Two grams of S-(4-vinylbenzyl)isothiouronium chloride are dissolved in 16 grams of methanol and this solution is added to a solution of 0.4 gram of benzoyl peroxide in 60 grams of styrene and 141 grams of benzene. The solution is heated at 50° C. for 128 hours, thereafter cooled to 25° C. and then slowly stirred into 1500 ml. of n-heptane whereupon the copolymer precipitates and is dried in vacuo at 50° C. to yield 18 grams of a solid, white, powdery copolymer. This is washed three times, by stirring in water at 45° C., followed by 3 washes with methanol at 45° C., then dried again as above. After dissolving in benzene and filtering to remove a small amount of insoluble material, the copolymer solution is freeze-dried.

An analysis of the freeze-dried copolymer gave 0.71% Cl, 0.58% N, and 0.61% S, which corresponds to 4.6% of the S-(4-vinylbenzyl)isothiouronium chloride in the copolymer.

Example C

One gram of S-(4-vinylbenzyl)isothiouronium chloride is dissolved in 16 grams of methanol and the resulting solution is stirred into 140 grams of benzene. To this solution is added 60 grams of n-butyl acrylate and 0.4 gram of benzoyl peroxide. The homogeneous solution (247 ml.) is heated at 50° C. for seven hours. Analysis performed on an aliquot thereof shows that the percent conversion of monomers to polymer is 23 percent.

A 25 ml. aliquot of the above polymer solution is freeze-dried under vacuum to remove unreacted n-butylacrylate. The rubbery solid is dissolved in 150 ml. of benzene. The resultant solution is clear. It does not contain insoluble material. S-(4-vinylbenzyl)isothiouronium chloride is insoluble in benzene and therefore the absence of inorganic materials indicates complete conversion of S-(4-vinylbenzyl)isothiouronium chloride into polymer. The expected composition of the copolymer is therefore 3.6% of the S-(4-vinylbenzyl)isothiouronium chloride. After another freeze-drying operation, the copolymer was analyzed and showed 0.47% nitrogen present corresponding to 3.8% S-(4-vinylbenzyl)isothiouronium chloride.

Example D

This example illustrates the preparation of the copolymer as a latex.

Four grams of S-(4-vinylbenzyl)isothiouronium chloride and 2 grams of dodecylamine hydrochloride are dissolved in 180 ml. of water. To this solution, 100 grams of styrene, 0.15 gram of mixed tertiary $C_{12}$ to $C_{16}$ mercaptans and 0.025 gram of a 2% aqueous solution of $K_2S_2O_8$ are added. The mixture is heated at 50° C. for sixteen hours under agitation, thereby producing a latex of the styrene and S-(4-vinylbenzyl)isothiouronium chloride copolymer.

In making the graft polymers of the present invention, polymerizable monomeric material selected from the group consisting of styrene, acrylonitrile, vinyl acetate, alkyl esters of acrylic acid having 1 to 12 carbon atoms in the alkyl radical and alkyl esters of methacrylic acid having 1 to 12 carbon atoms in the alkyl radical is grafted on a linear copolymer as described above and illustrated in Examples B, C and D after treatment of the copolymer as described below. Examples of the alkyl esters of acrylic and methacrylic acids are methyl acrylate, methyl methacrylate, butyl acrylate, lauryl methacrylate.

Before grafting, the copolymer will be dissolved or dispersed in a fluid medium, e.g., dissolved in an inert solvent such as benzene, toluene, or 2-butanone, or dispersed in water as in a copolymer latex, and the solution or dispersion is made basic by addition of an alkali such as ammonia or amine or an alkali-metal hydroxide, and the alkaline solution or dispersion is heated in a non-oxidizing atmosphere to convert isothiouronium chloride groups in the copolymer to mercapto groups which act as grafting cites. The amount of base added is not critical so long as the solution or dispersion is made alkaline. The temperature and time of heating are not critical and generally will be 30° C. to 80° C. for 10 minutes to 24 hours. The alkaline solution or dispersion of the treated copolymer is then made acidic for the grafting operation, as by addition of an acid such as acetic, phosphoric, sulfuric or hydrochloric acid. The amount of acid added is not critical so long as it is at least slightly in excess of the stoichiometric amount required to neutralize the base. The styrene, acrylonitrile, vinyl acetate, alkyl acrylate or alkyl methacrylate, or mixtures thereof, is then grafted on the thus treated copolymer in the acidic liquid medium in a non-oxidizing atmosphere by heating in the presence of a free-radical polymerization initiator. The time and temperature of heating are not critical and generally will be 30° C. to 80° C. for 3 to 48 hours. The free-radical polymerization initiator may be an alkali-metal persulfate or an organic peroxide or hydroperoxide catalyst or an azo catalyst, e.g., potassium persulfate, benzoyl peroxide, cumene hydroperoxide, tertiary-butyl hydroperoxide, N, N'-azobis(2-methylpropionitrile), p - methoxybenzenediazothio-2-naphthyl ether. The amount of polymerizable monomeric material that is added to the acidic solution or dispersion of the treated S-(4-vinylbenzyl)isothiouronium chloride copolymer is not critical. Generally, in forming the graft polymer, the added polymerizable monomeric material will be in major proportion and the S-(4-vinylbenzyl)isothiouronium chloride copolymer will be in minor proportion. While it is possible to heat the solution or dispersion of the polymerizable monomeric material and the treated S-(4-vinylbenzyl)isothiouronium chloride copolymer under conditions to force the grafting operation to completely react all the mercapto groups, generally the graft polymer will contain some residual mercapto groups. The graft copolymers containing residual mercapto groups may be cross-linked, if desired, by oxidizing the residual mercapto groups to disulfide groups as by admitting air to the acidic solution or dispersion of the graft polymer, or if cross-linking is not desired, the solution or dispersion of the graft polymer may be made alkaline so that the active mercapto groups may be converted into inactive groups by reaction with acrylonitrile, alkyl acrylate or alkyl methacrylate which may be present as residual unpolymerized polymerizable material or which may be added.

The following examples illustrate the invention. All parts, percentages and proportions referred to herein are by weight.

*Example I*

Sixty-eight hundredths gram of the linear copolymer of Example B above is dissolved in 18 grams of benzene. To this solution is added a solution of 0.034 g. of KOH dissolved in 0.8 gram of methanol making the solution of the copolymer basic. The solution is thoroughly flushed with nitrogen, then heated at 50° C. for sixteen hours. The solution is cooled to 25° C. and made acidic by the addition of 0.06 gram of acetic acid, followed by the addition of 4.7 grams of methyl methacrylate and 0.01 gram of N,N'-azobis(2-methylpropionitrile). The resultant solution is heated in a nitrogen atmosphere at 50° C. for sixteen hours. The polymer solution so produced is cooled to 25° C. and an amount of potassium hydroxide is added which is calculated to make the solution basic. This step inactivates any free mercapto groups present by converting them to methoxycarbonylethylthio groups by reaction with residual methyl methacrylate monomer and thereby preventing later undesired cross-linking. If a cross-linked product is desired, this basification step is omitted. After standing for about one-half hour at room temperature, the polymer solution is added to sufficient methanol to cause complete flocculation of the polymer. The polymer is removed from the liquid by filtration and again dissolved in benzene, reprecipitated by methanol, filtered, washed with methanol and vacuum dried at 60° C. to yield 3.73 grams of white, solid, powdery polymer.

That the polymer so obtained contains a graft copolymer is proved by subjecting it to a chromatographic separation by the procedure described by Baker and Williams, J. Chem. Soc., 2352 (1956). Using benzene and heptane as the solvent-nonsolvent mixture shows it to have a solubility different from that of the initial linear copolymer and that of polymethyl methacrylate. The thus isolated graft copolymer of methyl methacrylate on the linear copolymer contains substantially 35 percent bound styrene as determined by the method of Hilton et al., Anal. Chem., 31, 915–17 (1959).

The graft copolymer was shaped by placing it in a compression mold and heating at 160° C. for three minutes, thereafter cooling to room temperature and removing the shaped piece from the mold.

*Example II*

A freeze-dried sample of the copolymer of Example C weighing 1.29 grams is dissolved in 145 ml. of benzene. To this solution is added 0.02 gram of KOH dissolved in 0.8 gram of methanol making the solution of the copolymer basic. The solution is heated at 50° C. for 1¼ hours in a nitrogen atmosphere. The resultant solution is made acidic by the addition of .03 gram of acetic acid, followed by the addition of 10 grams of styrene monomer, 5 grams of acrylonitrile monomer and 0.2 gram of N,N'-azobis (2-methylpropionitrile). Heating in a nitrogen atmosphere is continued for 48 hours at 50° C. At the end of this time a determination of the percent solids shows that a 62% conversion of the styrene and acrylonitrile to polymer has been achieved. An aliquot of 50 ml. of the polymer solution is added at room temperature to an equal volume of dimethylformamide containing 4 grams of methyl methacrylate and 0.3 gram KOH. This last procedure converts unreacted mercapto groups to methoxycarbonylethylthio groups to prevent cross-linking by air. Where it is desired to obtain a cross-linked product, this step is omitted. The solution is centrifuged to remove a small amount of insoluble material and the clear solution is then added dropwise to 2 liters of methanol. The precipitated solid is filtered through a medium sintered glass filter and washed thoroughly with methanol. The solid is dried at 50° C. under vacuum for 3 hours. A white powdery polymer material is obtained.

That the polymer so obtained contains graft copolymer is proved by subjecting it to a chromatographic separation by the method of Baker and Williams. Using benzene and methanol as the solvent-nonsolvent mixture shows it to have a solubility different from that of the initial linear copolymer and that of the copolymer of styrene and acrylonitrile. The weight ratio of the copolymer of n-butyl acrylate and S-(4-vinylbenzyl)isothiouronium chloride to styrene and acrylonitrile in the isolated graft copolymer is 1:5:4 as determined by infrared analysis.

The product containing the graft copolymer was cast from a solution in benzene to form tough coherent films which adhere to metals such as iron.

*Example III*

A 150 ml. portion of the latex of Example D is dialyzed in water 3 times, each exposure lasting 12 hours. An aliquot of 30 ml. of the dialyzed latex is mixed with 0.8 ml. of a 5% dodecylamine hydrochloride solution and the total diluted to 40 ml. with water. The mixture is thoroughly flushed with nitrogen and sealed with a cap which allows addition of liquids by means of a hypodermic needle without introducing oxygen. Sufficient dodecylamine is added through the cap to make the mixture basic. After shaking overnight at room temperature, the mixture is heated to 50° C. and maintained at 50° C. for 15 minutes. Sufficient hydrochloric acid is then added to make the mixture acidic, after which 5 grams of methyl methacrylate and 0.6 ml. of a 2% potassium persulfate solution are added through the cap. The mixture is heated overnight at 50° C. The resultant polymer emulsion which is very viscous at this stage is cooled to room temperature and diluted with water to produce a fluid emulsion which precipitated when poured into dilute ammonium hydroxide.

After filtering, washing and drying, a portion of the white solid was dissolved in methyl ethyl ketone. The solution upon drying gave a homogeneous film.

Another portion of the polymer was shaped by placing it in a compression mold at 160° C. for 3 minutes, thereafter cooling to about room temperature and removing the shaped piece from the mold.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of making a graft copolymer which comprises making alkaline a liquid medium containing a linear copolymer of S-(4-vinylbenzyl)isothiouronium chloride and material selected from the group consisting of styrene, acrylonitrile, alkyl acrylates having 1 to 12 carbon atoms in said alkyl radical and alkyl methacrylates having 1 to 12 carbon atoms in said alkyl radical and heating in a non-oxidizing atmosphere, making said liquid medium acidic and adding a free-radical polymerization initiator and material selected from the group consisting of styrene, vinyl acetate, alkyl acrylates having 1 to 12 carbon atoms in the alkyl radical and alkyl methacrylates having 1 to 12 carbon atoms in the alkyl group, heating in a non-oxidizing atmosphere to form the graft copolymer, and recovering the graft copolymer from the liquid medium.

2. The method of making a graft copolymer which comprises dissolving in a solvent a linear copolymer of S-(4-vinylbenzyl)isothiouronium chloride and material selected from the group consisting of styrene, acrylonitrile, alkyl acrylates having 1 to 12 carbon atoms in said alkyl radical and alkyl methacrylates having 1 to 12 carbon atoms in said alkyl radical, making the solution of the copolymer basic and heating in a non-oxidizing atmosphere, making the solution acidic and adding a free-radical polymerization initiator and material selected from the group consisting of styrene, acrylonitrile, vinyl acetate, alkyl acrylates having 1 to 12 carbon atoms in the alkyl radical and alkyl methacrylates having 1 to 12 carbon atoms in the alkyl group, heating in a non-oxidizing atmosphere to form the graft copolymer, and recovering the graft copolymer from solution.

3. The method of making a graft copolymer which comprises making alkaline an aqueous dispersion of a linear copolymer of S-(4-vinylbenzyl)isothiouronium chloride and material selected from the group consisting of styrene, acrylonitrile, alkyl acrylates having 1 to 12 carbon atoms in said alkyl radical and alkyl methacrylates having 1 to 12 carbon atoms in said alkyl radical and heating in a non-oxidizing atmosphere, making the dispersion acidic and adding a free-radical polymerization initiator and material selected from the group consisting of styrene, acrylonitrile, vinyl acetate, alkyl acrylates having 1 to 12 carbon atoms in the alkyl radical and alkyl methacrylates having 1 to 12 carbon atoms in the alkyl group, heating in a non-oxidizing atmosphere to form the graft copolymer, and recovering the graft copolymer from solution.

4. A graft copolymer of material selected from the group consisting of styrene, acrylonitrile, vinyl acetate, alkyl acrylates having 1 to 12 carbon atoms in the alkyl radical and alkyl methacrylates having 1 to 12 carbon atoms in the alkyl radical grafted on a linear copolymer of S-(4-vinylbenzyl)isothiouronium chloride and material selected from the group consisting of styrene, acrylonitrile, alkyl acrylates having 1 to 12 carbon atoms in the alkyl radical and alkyl methacrylates having 1 to 12 carbon atoms in the alkyl radical, which copolymer has had at least some of its isothiouronium chloride groups converted to mercapto groups.

5. A graft copolymer of a major proportion of material selected from the group consisting of styrene, acrylonitrile, vinyl acetate, alkyl acrylates having 1 to 12 carbon atoms in the alkyl radical and alkyl methacrylates having 1 to 12 carbon atoms in the alkyl radical grafted on a minor proportion of a linear copolymer of a minor proportion of S-(4-vinylbenzyl)isothiouronium chloride and a major proportion of material selected from the group consisting of styrene, acrylonitrile, alkyl acrylates having 1 to 12 carbon atoms in the alkyl radical and alkyl methacrylates having 1 to 12 carbon atoms in the alkyl radical, which copolymer has had at least some of its isothiouronium chloride groups converted to mercapto groups.

6. A graft copolymer of methyl methacrylate on a linear copolymer of styrene and S-(4-vinylbenzyl)isothiouronium chloride which copolymer has had at least some of its isothiouronium chloride groups converted to mercapto groups.

7. A graft copolymer of a major proportion of methyl methacrylate on a minor proportion of a linear copolymer of styrene and S-(4-vinylbenzyl)isothiouronium chloride which copolymer has had at least some of its isothiouronium groups converted to mercapto groups.

8. A graft copolymer for a major proportion of methyl methacrylate on a minor proportion of a linear copolymer of a major proportion of styrene and a minor proportion of S-(4-vinylbenzyl)isothiouronium chloride which copolymer has had at least some of its isothiouronium groups converted to mercapto groups.

9. A graft copolymer of styrene and acrylonitrile on a linear copolymer of n-butyl acrylate and S-(4-vinylbenzyl)isothiouronium chloride which copolymer has had at least some of its isothiouronium chloride groups converted to mercapto groups.

10. A graft copolymer of a major proportion of styrene and acrylonitrile on a minor proportion of a linear copolymer of n-butyl acrylate and S-(4-vinylbenzyl)isothiouronium chloride which copolymer has had at least some of its isothiouronium chloride groups converted to mercapto groups.

11. A graft copolymer of a major proportion of styrene and acrylonitrile on a minor proportion of a linear copolymer of a major proportion of n-butyl acrylate and a minor proportion of S-(4-vinylbenzyl)isothiouronium chloride which copolymer has had at least some of its isothiouronium chloride groups converted to mercapto groups.

References Cited by the Examiner

UNITED STATES PATENTS

| 2,594,579 | 4/1952 | Novotny et al. | 260—79.7 |
| 2,640,079 | 5/1953 | De Benneville et al. | 260—564 |
| 3,088,849 | 5/1963 | Friedlander | 260—564 |
| 3,179,638 | 4/1965 | Shashoua | 260—79.7 |

OTHER REFERENCES

Burlant et al., Block and Graft Polymers, Reinhold, New York, 1960, pages 17 and 26–28 of interest.

SAMUEL H. BLECH, *Primary Examiner.*